United States Patent
Xie (10) Patent No.: US 9,886,122 B2
(45) Date of Patent: Feb. 6, 2018

(54) ARRAY SUBSTRATE, AND CAPACITIVE IN-CELL TOUCH PANEL WITH THE ARRAY SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Zhenyu Xie, Beijing (CN)

(73) Assignees: BOE TECHNOLOGY GROUP CO., LTD. (CN); BEIJING BOE OPTOELECTRONICS TECHNOLOGY CO., LTD. (CN)

(*) Notice: Subject to any disclaimer, the term of this patent is extended or adjusted under 35 U.S.C. 154(b) by 120 days.

(21) Appl. No.: 14/771,522

(22) PCT Filed: Dec. 9, 2014

(86) PCT No.: PCT/CN2014/093350
§ 371 (c)(1),
(2) Date: Aug. 31, 2015

(87) PCT Pub. No.: WO2016/037427
PCT Pub. Date: Mar. 17, 2016

(65) Prior Publication Data
US 2016/0370914 A1 Dec. 22, 2016

(30) Foreign Application Priority Data
Sep. 10, 2014 (CN) .......................... 2014 1 0458393

(51) Int. Cl.
*G06F 3/041* (2006.01)
*G02F 1/1333* (2006.01)
*G02F 1/1335* (2006.01)
*G02F 1/1343* (2006.01)
(Continued)

(52) U.S. Cl.
CPC ........ *G06F 3/0416* (2013.01); *G02F 1/13338* (2013.01); *G02F 1/13439* (2013.01);
(Continued)

(58) Field of Classification Search
CPC ........ G02F 1/1335; G02F 1/13; G02F 1/1368; G06F 3/041; G06F 3/045; G06F 3/04; G06F 3/044; G01R 27/26
See application file for complete search history.

(56) References Cited

U.S. PATENT DOCUMENTS

2012/0162584 A1* 6/2012 Chang .................. G06F 3/0412
349/106
2014/0118299 A1* 5/2014 Wang .................... G06F 3/0416
345/174
(Continued)

FOREIGN PATENT DOCUMENTS

CN 102841718 A 12/2012
CN 202711227 U 1/2013
(Continued)

OTHER PUBLICATIONS

Office Action in Chinese Patent Application No. 201410458393.0, dated Sep. 2, 2016.
(Continued)

*Primary Examiner* — Pegeman Karimi
(74) *Attorney, Agent, or Firm* — Brooks Kushman P.C.

(57) ABSTRACT

The present disclosure provides an array substrate and a capacitive in-cell touch panel with the array substrate. The array substrate includes a common electrode layer which is partitioned into a plurality of touch driving electrodes and a plurality of common electrodes arranged alternately. Each touch driving electrode is configured to be applied with a common electrode signal and a touch scanning signal in a time-division manner. Each touch driving electrode includes a plurality of touch driving sub-electrodes spaced apart from each other in an extension direction of the touch driving electrode, and metal wires configured to connect the adjacent touch driving sub-electrodes.

20 Claims, 6 Drawing Sheets

(51) Int. Cl.
*G02F 1/1362* (2006.01)
*G06F 3/044* (2006.01)
*G02F 1/1368* (2006.01)

(52) U.S. Cl.
CPC .. *G02F 1/133514* (2013.01); *G02F 1/134336* (2013.01); *G02F 1/136286* (2013.01); *G06F 3/041* (2013.01); *G06F 3/044* (2013.01); *G06F 3/0412* (2013.01); *G02F 1/1368* (2013.01); *G02F 2001/136295* (2013.01); *G02F 2201/121* (2013.01)

(56) References Cited

U.S. PATENT DOCUMENTS

| | | | |
|---|---|---|---|
| 2014/0184559 A1* | 7/2014 | Han | G06F 3/0412 345/174 |
| 2014/0247402 A1* | 9/2014 | Chou | G02F 1/13338 349/12 |

FOREIGN PATENT DOCUMENTS

| | | |
|---|---|---|
| CN | 102914920 A | 2/2013 |
| CN | 102945106 A | 2/2013 |
| CN | 102955636 A | 3/2013 |
| CN | 103838430 A | 6/2014 |

OTHER PUBLICATIONS

International Search Report and Written Opinion in PCT International Application No. PCT/CN2014/093350, dated Jun. 15, 2015.

* cited by examiner

ARRAY SUBSTRATE, AND CAPACITIVE IN-CELL TOUCH PANEL WITH THE ARRAY SUBSTRATE

CROSS-REFERENCE TO RELATED APPLICATIONS

The present application is the U.S. National Phase of PCT Application No. PCT/CN2014/093350 filed on Dec. 9, 2014, which claims a priority of the Chinese patent application No.201410458393.0 filed on Sep. 10, 2014, the disclosures of which are incorporated herein by reference in their entirety.

TECHNICAL FIELD

The present disclosure relates to the field of display technology, in particular to an array substrate, and a capacitive in-cell touch panel with the array substrate.

BACKGROUND

For a capacitive in-cell touch technology, two layers of strip-like indium tin oxide (ITO) electrodes that overlap each other in different planes are formed in a liquid crystal panel. The two layers of electrodes serve as a touch driving electrode Tx and a touch sensing electrode Rx for a touch panel, respectively, and a sensing capacitor is formed at a position where the two ITO electrodes overlap each other in different planes. An operational procedure of a capacitive in-cell touch panel will be described hereinafter. When a touch scanning signal is applied to the touch driving electrode Tx, a voltage signal generated by the sensing capacitor on the touch sensing electrode Rx is detected. During this procedure, when a body part touches the touch panel, an electric field of the body part will act on the sensing capacitor, so as to change a capacitance value of the sensing capacitor, thereby to change the voltage signal generated on the touch sensing electrode Rx. Then, a position of a touch point may be determined in accordance with the change of the voltage signal.

Figure 1:
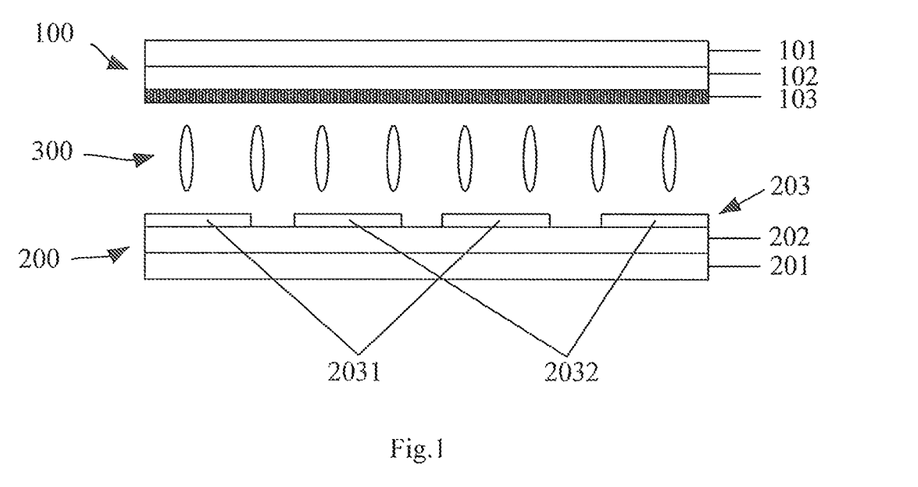
FIG. 1 is a schematic view showing an existing ADS-mode capacitive in-cell touch panel.

Currently, the capacitive in-cell touch technology has been applied to an advanced super dimension switch (ADS)-mode liquid crystal panel by some manufacturers. Referring to FIG. 1, which is a schematic view showing an existing ADS-mode capacitive in-cell touch panel, the capacitive in-cell touch panel includes a color filter (Cf) substrate 100, a (thin film transistor (TFT)) array substrate 200, and a liquid crystal layer 300 arranged between the color filter substrate 100 and the array substrate 200. The color filter substrate 100 includes a base substrate 101, a CF functional layer 102 and a touch sensing electrode 103. The array substrate 200 includes a base substrate 201, a TFT functional layer 202 and a common electrode layer 203. The common electrode layer 203 is partitioned into a plurality of touch driving electrodes 2031 and a plurality of common electrodes 2032 arranged alternately, so as to drive the touch driving electrodes 2031 in a time-division manner, thereby to achieve a display function and a touch function. Due to the time-division mode, it is able to reduce the mutual interference between the display and the touch, thereby to improve the display quality and the touch accuracy.

In the above-mentioned in-cell touch panel, the common electrodes are multiplexed as the touch driving electrodes, and meanwhile the common electrode, which is usually made of a transparent metal oxide, e.g., ITO or indium zinc oxide (IZO), has a relatively lame resistance, so signal delay may occur for the touch driving electrode.

SUMMARY

An object of the present disclosure is to provide an array substrate, and a capacitive in-cell touch panel with the array substrate, so as to reduce signal delay for a touch driving electrode.

In one aspect, the present disclosure provides in one embodiment an array substrate, including a common electrode layer which is partitioned into a plurality of touch driving electrodes and a plurality of common electrodes arranged alternately. Each touch driving electrode is configured to be applied with a common electrode signal and a touch scanning signal in a time-division manner. Each touch driving electrode includes a plurality of touch driving sub-electrodes spaced apart from each other in an extension direction of the touch driving electrode, and metal wires configured to connect the adjacent touch driving sub-electrodes.

Alternatively, the metal wires are arranged at a layer different from the touch driving sub-electrodes, and connected to the touch driving sub-electrodes in parallel.

Alternatively, the metal wires are arranged at the common electrode layer, and connected to the touch driving sub-electrodes in series.

Alternatively, the metal wire partially overlaps a touch sensing electrode. When the touch driving electrode extends in a row direction, the metal wire is of a width in a column direction less than the touch driving sub-electrode, and when the touch driving electrode extends in the column direction, the metal wire is of a width in the row direction less than the touch driving sub-electrode.

Alternatively, an overlapping area of the metal wire with the touch sensing electrode is within a range from 2 to 3 square microns.

Alternatively, the metal wire is located at a region corresponding to a gate line or a data line.

Alternatively, the metal wire is made of Al or Cu.

Alternatively, the common electrode is of a structure identical to the touch driving electrode.

Alternatively, the common electrode is a strip-like electrode.

In another aspect, the present disclosure provides in one embodiment an in-cell touch panel including the abovementioned array substrate.

Alternatively, the in-cell touch panel is of an advanced super dimension switch (ADS) mode.

Alternatively, the in-cell touch panel further includes a color filter substrate which includes a touch sensing electrode and a plurality of pixel units.

Alternatively, the touch sensing electrode is arranged at a non-aperture region of the pixel unit.

Alternatively, the touch sensing electrode is made of a metal material.

According to the embodiments of the present disclosure, the plurality of touch driving sub-electrodes of the touch driving electrode is connected in series through the metal wires with a low resistance, so it is able to effectively reduce the resistance of the touch driving electrode, thereby to reduce the signal delay for the touch driving electrode and improve the touch performance of the in-cell touch panel with the array substrate.

DETAILED DESCRIPTION

In order to make the objects, the technical solutions and the advantages of the present disclosure more apparent, the present disclosure will be described hereinafter in conjunction with the drawings and embodiments.

First Embodiment

Figure 2:
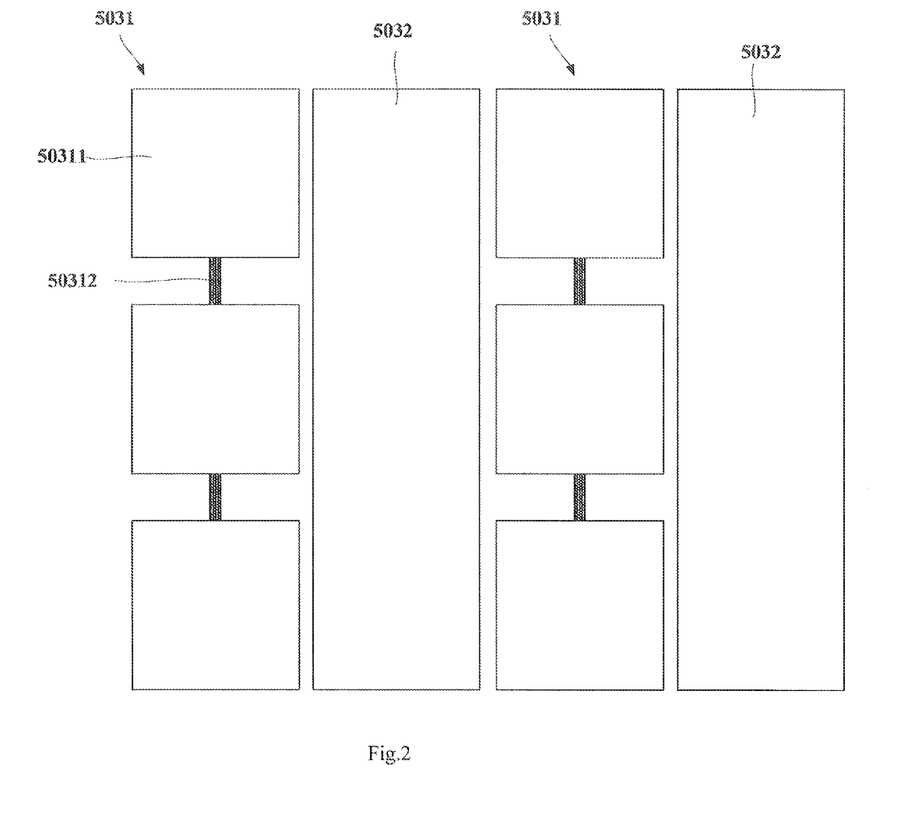
FIG. 2 is a schematic view showing a common electrode layer of an array substrate according to a first embodiment of the present disclosure.

An array substrate in this embodiment includes a common electrode layer. Referring to FIG. 2, which is a schematic view showing the common electrode layer of the array substrate, the common electrode layer is partitioned into a plurality of touch driving electrodes 5031 and a plurality of common electrodes 5032 arranged alternately, and the touch driving electrode 5031 is configured to be applied with a common electrode signal and a touch scanning signal in a time-division manner. To be specific, at a display stage, the touch driving electrode 5031 serves as a common electrode, so as to be applied with the common electrode signal, and at a touch stage, the touch driving electrode 5031 is configured to be applied with the touch scanning signal. Through the time-division mode, it is able to reduce the mutual interference between the display function and the touch function, thereby to improve the display quality and the touch accuracy.

In order to reduce a resistance of the touch driving electrode, in this embodiment, each touch driving electrode 5031 includes a plurality of touch driving sub-electrodes 50311 spaced apart from each other in an extension direction of the touch driving electrode 5031, and metal wires 50312 configured to connect the adjacent touch driving sub-electrodes 50311.

In this embodiment, the touch driving electrode 5031 and the common electrode 5032 extend in a column direction. Of course, in some other embodiments, they may extend in a row direction too.

The touch driving sub-electrode 50311 is usually made of a transparent metal oxide, such as ITO or IZO, and the metal wire 50312 is usually made of a low-resistance metal material such as Al or Cu. The plurality of touch driving sub-electrodes 50311 of the touch driving electrode 5031 is connected in series through the low-resistance metal wires, so it is able to effectively reduce the resistance of the touch driving electrode 5031, thereby to reduce the signal delay for the touch driving electrode 5031 and improve the touch performance of an in-cell touch panel with the array substrate.

Second Embodiment

Figure 3:
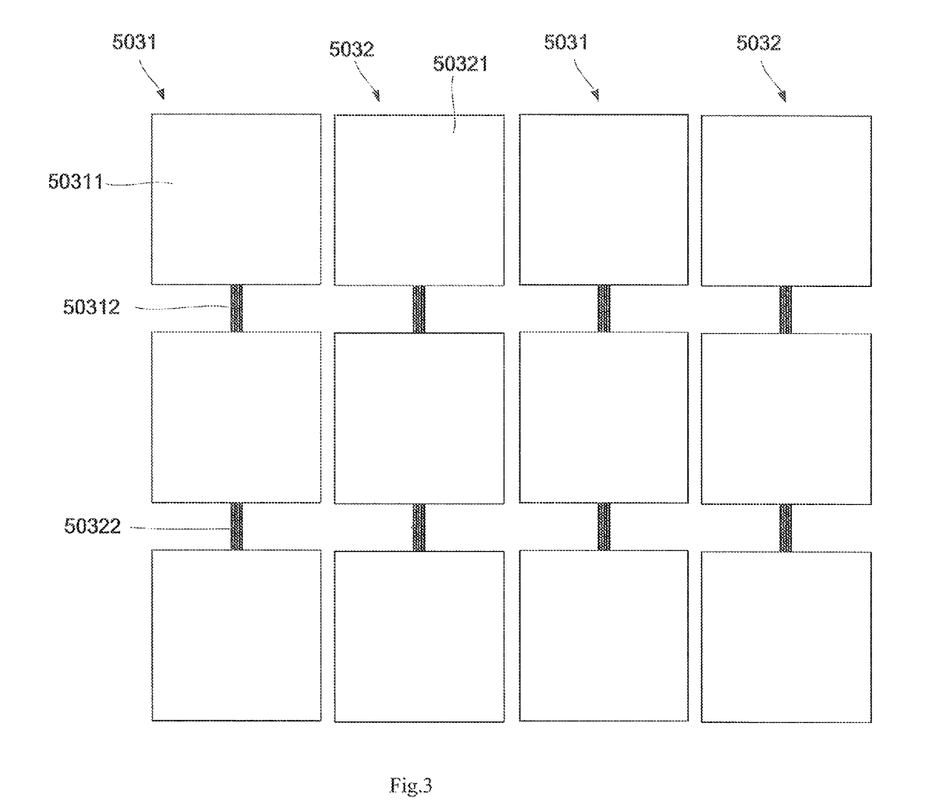
FIG. 3 is another schematic view showing the common electrode layer of the array substrate according to a second embodiment of the present disclosure.

The array substrate in this embodiment includes a common electrode layer. Referring to FIG. 3, which is a schematic view showing the common electrode layer of the array substrate, the common electrode layer in this embodiment differs from that in the first embodiment in that, in this embodiment, the common electrode 5032 is of a structure identical to the touch driving electrode 5031, while in the first embodiment, the common electrode 5032 is a strip-like electrode.

In this embodiment, each common electrode 5032 includes a plurality of common sub-electrodes 50321 spaced apart from each other in an extension direction of the common electrode 5032, and metal wires 50322 configured to connect the adjacent common sub-electrodes 50321. The common sub-electrode 50321 is of a size identical to the touch driving sub-electrode 50311.

Because the structure of the common electrode 5032 is identical to the touch driving electrode 5031, their resistances are the same too. At the display stage, it takes the same time for the common electrode 5032 and the touch driving electrode 5031 to transmit signals. As a result, it is able to prevent the occurrence of flicker at the in-cell touch panel with the array substrate, thereby to improve the display quality.

Figure 4:
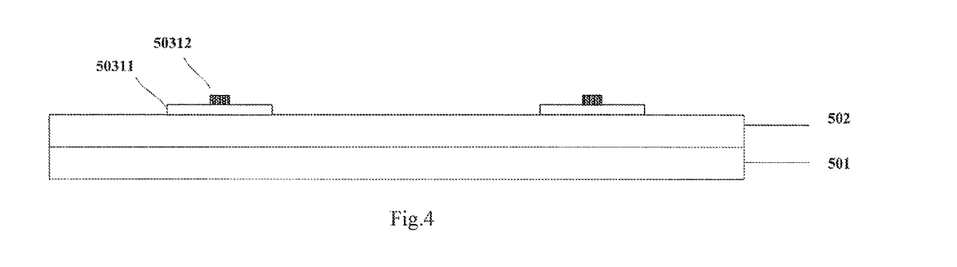
FIG. 4 is a schematic view showing a connection mode for a metal wire and touch driving sub-electrodes according to one embodiment of the present disclosure.

As shown in FIG. 4, which is a schematic view showing a connection mode for the metal wire and the touch driving sub-electrodes, 501 represents a base substrate of the array substrate, and 502 represents a TFT functional layer of the array substrate. The TFT functional layer usually includes a gate electrode, a gate insulating layer, an active layer and source/drain electrodes. In this embodiment, the metal wire 50312 is located at a layer different from the touch driving sub-electrode 50311, arranged on the touch driving sub-electrode 50311, and connected thereto in parallel. Because the metal wire 50312 is connected to the touch, driving sub-electrode 50311 in parallel, so it is able to remarkably reduce the resistance of the touch driving electrode. It should be appreciated that, in another embodiment, the metal wire 50312 may also be arranged under the touch driving sub-electrode 50311.

Figure 5:
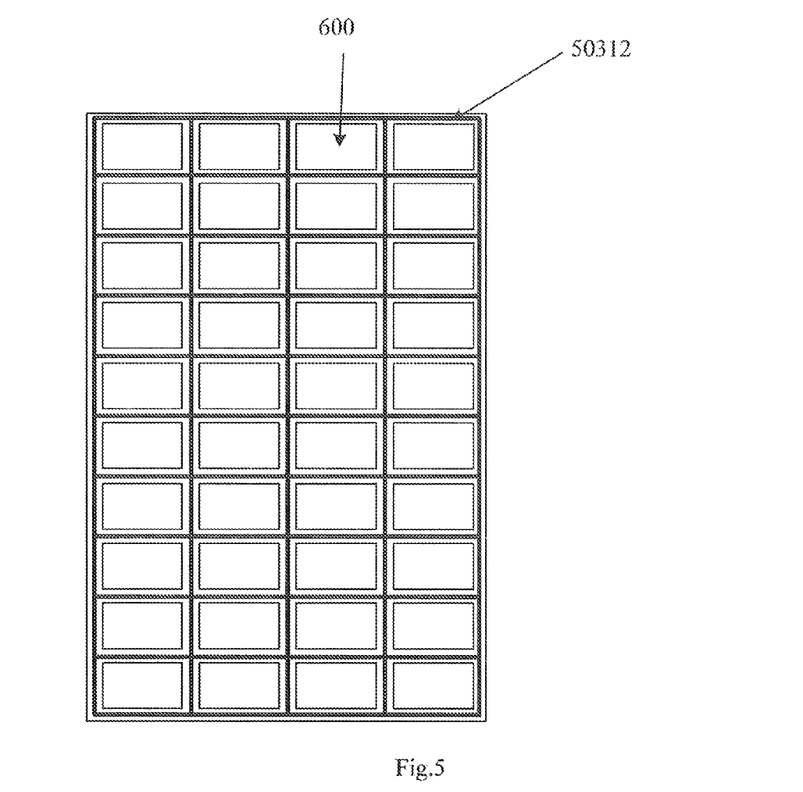
FIG. 5 is a planar view of the metal wire according to one embodiment of the present disclosure.

As shown in FIG. 5, which is a planar view of the metal wire, a square region 600 represents a pixel region defined by gate lines and data lines arranged in a crisscross manner, and the metal wires 50312 are arranged at regions corresponding to the gate lines and the data lines.

Of course, in some other embodiments, the metal wires may merely be arranged at regions corresponding to the gate lines or the data lines.

Figure 6:
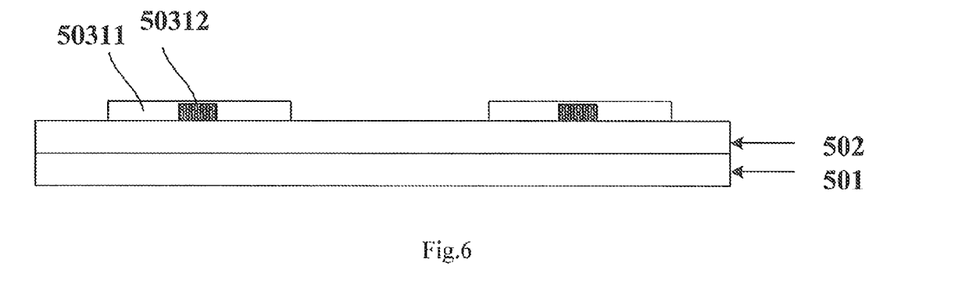
FIG. 6 is another schematic view showing a connection mode for the metal wire and the touch driving sub-electrodes according to one embodiment of the present disclosure.

As shown in FIG. 6, which is another schematic view showing a connection mode for the metal wires and the touch driving sub-electrodes, 501 represents a base substrate of the array substrate, and 502 represents a TFT functional layer of the array substrate. The TFT functional layer usually includes a gate electrode, a gate insulating layer, an active layer and source/drain electrodes. In this embodiment, the metal wire 50312 and the touch driving sub-electrode 50311 are both located at the common electrode layer, and the metal wire 50312 is arranged between the two adjacent touch driving sub-electrodes 50311 and connected thereto in series.

On the basis of a formula $C=\epsilon S/d$ for calculating a sensing capacitance between the touch driving electrode and the touch sensing electrode, the sensing capacitance C is proportional to an overlapping area S between the touch diving electrode and the touch sensing, electrode. As a result, it is able to reduce the sensing capacitance C by reducing the overlapping area S between the touch driving electrode and the touch sensing electrode.

Figure 7:
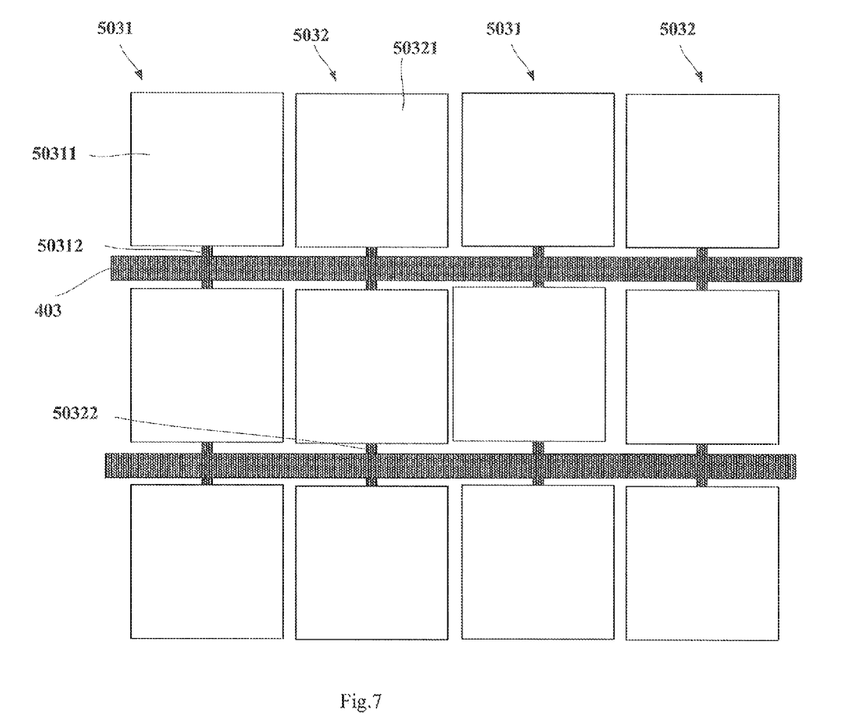
FIG. 7 is a schematic view showing a touch driving electrode and a touch sensing electrode according to one embodiment of the present disclosure.

As shown in FIG. 7, which is a schematic view showing the touch driving electrode and the touch sensing electrode, the metal wire 50312 partially overlaps the touch sensing electrode 403. In this embodiment, the touch driving electrode 5031 extends in the column direction, and at this time, the metal wire 50312 is of a width in the row direction less than the touch driving sub-electrode 50311.

Of course, the touch driving electrode 5031 may also extend in the row direction, and at this time, the metal wire 50312 is of a width in the column direction less than the touch driving sub-electrode 50311.

According to the array substrate in the embodiments of the present disclosure, it is able to reduce the overlapping area between the touch driving electrode and the touch sensing electrode, thereby to reduce the sensing capacitance C formed at a position where the touch sensing electrode overlaps the touch sensing electrode. When an electrode field of a body part acts on the sensing capacitance, an obvious change may occur, so it is able to improve the sensitivity of the in-cell touch panel with the array substrate.

Alternatively, the overlapping area of the metal wire with the touch sensing electrode is within a range from 2 to 3 square microns.

The present disclosure further provides in one embodiment an in-cell touch panel including the above-mentioned array substrate. The in-cell touch panel may further include a color filter substrate which includes a touch sensing electrode and a plurality of pixel units. The in-cell touch panel may be of an ADS mode, i.e., the touch sensing electrode is arranged on the color filter substrate which includes a plurality of pixel units.

Alternatively, the touch sensing electrode is arranged at a non-aperture region of the pixel unit. Usually, a black matrix is arranged at the non-aperture region and at a position corresponding to the gate line or data line. Alternatively, the metal wire is also arranged at a position corresponding to the non-aperture region.

Alternatively, the touch sensing electrode may be made of a metal material, so as to reduce a resistance of the touch sensing electrode, thereby to increase the transmission speed of the signal in the touch sensing electrode.

Figure 8:
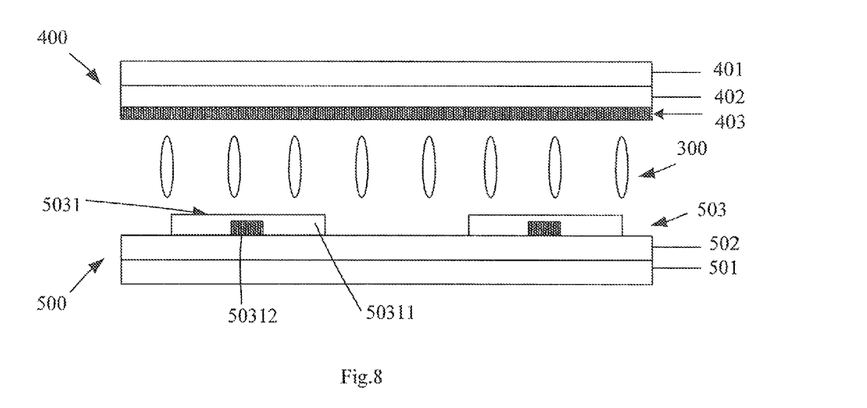
FIG. 8 is a sectional view of an in-cell touch panel according to one embodiment of the present disclosure.

As shown in FIG. 8, which is a sectional view of the in-cell touch panel, the in-cell touch panel includes a color filter substrate 400, an array substrate 500 and a liquid crystal layer 300 arranged between the color filter substrate 400 and the array substrate 500. The color filter substrate 400 includes a base substrate 401, a color filter (CF) functional layer 402 and the touch sensing electrode 403. The array substrate 500 includes a base substrate 501, a TFT functional layer 502 and a common electrode layer 503. The common electrode layer 503 is partitioned into a plurality of touch driving electrodes 5031 and a plurality of common electrodes arranged alternately (not shown). Each touch driving electrode 5031 includes a plurality of touch driving sub-electrodes 50311 spaced apart from each other in an extension direction of the touch driving electrode 5031, and metal wires 50312 configured to connect the adjacent touch driving sub-electrodes 50311. The metal wire 50312 and the touch driving sub-electrode 50311 are arranged at the common electrode layer 503, and the metal wire 50312 is connected to the touch driving sub-electrode 50311 in series.

Figure 9:
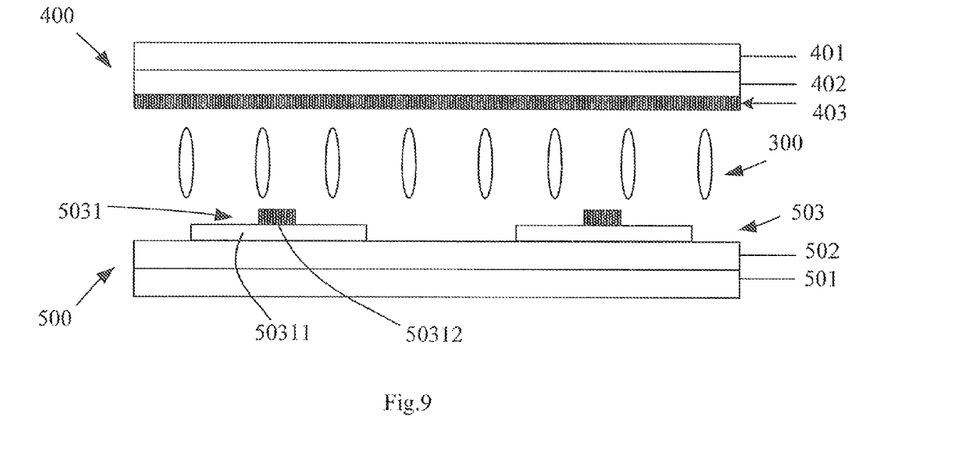
FIG. 9 is another sectional view of the in-cell touch panel according to one embodiment of the present disclosure.

As shown in FIG. 9, which is another sectional view of the in-cell touch panel, the in-cell touch panel includes a color filter substrate 400, an array substrate 500 and a liquid crystal layer 300 arranged between the color filter substrate 400 and the array substrate 500. The color filter substrate 400 includes a base substrate 401, a CF functional layer 402 and a touch. sensing electrode 403. The array substrate 500 includes a base substrate 501, a TFT functional layer 502 and a common electrode layer 503. The common electrode layer 503 is partitioned into a plurality of touch driving electrodes 5031 and a plurality of common electrodes (not shown) arranged alternately. Each touch driving electrode 5031 includes a plurality of touch driving sub-electrodes 50311 spaced apart from each other in an extension direction of the touch driving electrode 5031, and metal wires 50312 configured to connect the adjacent touch driving sub-electrodes 50311. The metal wire 50312 is arranged above the touch driving sub-electrode 50311 and connected thereto in parallel.

In addition, it should be appreciated that, in the drawings, sizes and scales of the touch driving sub-electrodes and the metal wires are for illustrative purposes only, but shall not be used to limit the scope of the present disclosure.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An array substrate, comprising a common electrode layer which is partitioned into a plurality of touch driving electrodes and a plurality of common electrodes arranged alternately, each touch driving electrode being configured to be applied with a common electrode signal and a touch scanning signal in a time-division manner,
   wherein each touch driving electrode comprises:
   a plurality of touch driving sub-electrodes spaced apart from each other in an extension direction of the touch driving electrode, and
   metal wires configured to connect the adjacent touch driving sub-electrodes,
   wherein the metal wire partially overlaps a touch sensing electrode, when the touch driving electrode extends in a row direction, the metal wire is of a width in a column direction less than the touch driving sub-electrode, and when the touch driving electrode extends in the column direction, the metal wire is of a width in the row direction less than the touch driving sub-electrode,
   wherein an overlapping area of the metal wire with the touch sensing electrode is within a range from 2 to 3 square microns.

2. The array substrate according to claim 1, wherein the metal wires are arranged at a layer different from the touch driving sub-electrodes, and connected to the touch driving sub-electrodes in parallel.

3. The array substrate according to claim 2, wherein the metal wire is made of Al or Cu.

4. The array substrate according to claim 2, wherein the common electrode is of a structure identical to the touch driving electrode.

5. The array substrate according to claim 1, wherein the metal wires are arranged at the common electrode layer, and connected to the touch driving sub-electrodes in series.

6. The array substrate according to claim 5, wherein the metal wire is made of Al or Cu.

7. The array substrate according to claim 5, wherein the common electrode is of a structure identical to the touch driving electrode.

8. The array substrate according to claim 1, wherein the metal wire is located at a region corresponding to a gate line or a data line.

9. The array substrate according to claim 8, wherein the metal wire is made of Al or Cu.

10. The array substrate according to claim 8, wherein the common electrode is of a structure identical to the touch driving electrode.

11. The array substrate according to claim 1, wherein the metal wire is made of Al or Cu.

12. The array substrate according to claim 1, wherein the common electrode is of a structure identical to the touch driving electrode.

13. The array substrate according to claim 12, wherein the metal wire is made of Al or Cu.

14. The array substrate according to claim 1, wherein the common electrode is a strip-like electrode.

15. The array substrate according to claim 14, wherein the metal wire is made of Al or Cu.

16. An in-cell touch panel, comprising the array substrate according to claim 1.

17. The in-cell touch panel according to claim 16, wherein the in-cell touch panel is of an advanced super dimension switch (ADS) mode.

18. The in-cell touch panel according to claim 16, further comprising a color filter substrate which includes a touch sensing electrode and a plurality of pixel units.

19. The in-cell touch panel according to claim 18, wherein the touch sensing electrode is located at a non-aperture region of the pixel unit.

20. The in-cell touch panel according to claim 18, wherein the touch sensing electrode is made of a metal material.

* * * * *